Patented Jan. 29, 1924.

1,482,336

UNITED STATES PATENT OFFICE.

BURT H. YACKEE, OF AKRON, OHIO, ASSIGNOR TO THE GOODYEAR TIRE & RUBBER COMPANY, OF AKRON, OHIO, A CORPORATION OF OHIO.

METHOD OF MAKING RUBBERIZED FIBER COMPOSITION.

No Drawing. Application filed September 16, 1922. Serial No. 588,713.

*To all whom it may concern:*

Be it known that I, BURT H. YACKEE, a citizen of the United States, and resident of Akron, Ohio, have invented new and useful Improvements in Methods of Making Rubberized Fiber Composition, of which the following is a specification.

My invention pertains to rubberized fiber composition, which may be utilized in a variety of capacities, such as for floor or wall coverings, as a substitute for leather, or for any purpose to which a tough flexible porous body may be adapted.

My invention relates particularly to the method of treating fibers and of depositing rubber coatings on the individual fibers in the course of manufacture of the composition.

I have found that it is desirable, in preparing fibers to be employed in a rubberized fiber composition, to first beat the fibers in water in any suitable machine, such, for example, as those employed for a similar purpose in the paper manufacturing industry. The beating of the fibers causes them to separate from each other and when continued for a sufficient period, a gelatinous substance, known as dextrin, is produced. When beaten properly the ends of the fibers will flay and curl, which aids in producing the proper felting and interlocking arrangement of the fibers.

After the fibers have been thoroughly beaten in water, they are strained therefrom and subjected to a bath of alcohol. The alcohol displaces the water in the fibers. As much of the alcohol as possible is then removed from the fibers by compressing the same, and the fibers are immersed in a bath of toluol. The fibers are strained from the alcohol, and, wet with the toluol, are then mixed in a solution composed of rubber, alcohol and toluol. The rubber in solution is then precipitated upon the individual fibers by any desired method, such, for example, as the addition of a rubber precipitant, the addition of a suitable mixture of rubber precipitant and rubber solvent, or suitably regulating the temperature of the mixture.

After the rubber has been deposited upon the fibers, they are strained from the liquid in which they are suspended and are formed into molded articles, or they may be formed into a continuous sheet of material by means of a Fourdrinier machine, as commonly used in the manufacture of paper.

If desired, the alcohol in the fibers, after the removal of the water therefrom, may be replaced by the solution of alcohol and toluol. The presence of toluol in the fibers at the time of the precipitation of rubber thereon being highly desirable as it facilitates the impregnation of the fibers with rubber and aids in causing the rubber to be spread over the entire surface of the fiber in a uniform coating which is securely fastened thereto. If the fibers be impregnated with alcohol alone, or a mixture in which alcohol is predominant, the alcohol prevents the rubber from entering and impregnating the fibers and causes it to be deposited upon the surface in small clumps or clots rather than in a uniform coating thereover.

Also, the water remaining in the fibers after the beating process may be removed therefrom by immersing the fibers in an alcohol toluol solution, from which the fibers are drained before mixing them with the alcohol toluol rubber solution.

From the foregoing description, it will be apparent that I have produced dextrin, which is very essential in the manufacture of articles composed of fiber, by beating the fibers in water. As water cannot readily be removed by toluol, it is necessary to use alcohol, or a solution of alcohol and toluol for this purpose. Toluol is not miscible with water, whereas either alcohol or a mixture of alcohol and toluol is, and, in order to displace the water in the fibers, it is necessary to employ a liquid miscible with the water. If alcohol alone is employed, it is subsequently substituted by toluol, so that at the time of precipitation of the rubber thereon, the fibers are impregnated with a rubber solvent.

Throughout this specification, I have referred to the material beaten merely as fibers. It is understood that I may employ for this purpose any of the well known vegetable or animal fibers, such for example, as cotton, linen, hemp, manila, jute, asbestos, wood, leather, hair, fur or any other similar felting material. Also I have referred specifically to the use of toluol as a rubber solvent. Other solvents, particularly those of the benzine family, such as benzol or gasoline may be employed in a like capacity.

Also, acetone or any other suitable precipitant may be substituted for alcohol, although I have found alcohol to be preferable.

Owing to the presence of the dextrin, together with the thorough impregnation of the fibers with the rubber, a material is produced, by practising my invention, which has a materially greater tensile strength, as well as greater toughness and resistance to tearing, than any similar material heretofore produced.

Although I have described several forms which my invention may assume, it will be obvious to those skilled in the art that it is not so limited but that various minor modifications and changes may be made therein without departing from the spirit of my invention or from the scope of the appended claims.

What I claim is:

1. A method of treating fibers which comprises beating them in water, removing them from the water, displacing the water in the fibers with a rubber precipitant, displacing the precipitant in the fibers with the rubber solvent, and impregnating the fibers with rubber and depositing a coating of rubber on the individual fibers.

2. A method of treating fibers which comprises beating them in water, removing them from the water, displacing the water in the fibers with a rubber precipitant, displacing the precipitant in the fibers with a mixture of rubber solvent and rubber precipitant, and depositing a coating of rubber on the individual fibers.

3. A method of treating fibers which comprises beating them in water, removing them from the water, displacing the water in the fibers with a rubber precipitant, displacing the precipitant in the fibers with a rubber solvent, dispersing the fibers in a solution comprising rubber, rubber solvent and rubber precipitant, and precipitating the rubber upon the fibers.

4. A method of treating fibers that comprises beating them in water, removing them from the water, displacing the water in the fibers with alcohol, displacing the alcohol with toluol, and depositing a coating of rubber on the fibers.

5. A method of treating fibers that comprises beating them in water, removing them from the water, displacing the water in the fibers with alcohol, displacing the alcohol with toluol, and precipitating a coating of rubber on the individual fibers.

6. A method of treating fibers that comprises beating them in water, removing them from the water, displacing the water in the fibers with alcohol, displacing the alcohol with toluol, and mixing the fibers in a rubber alcohol toluol solution, and precipitating a coating of rubber upon said fibers.

7. A method of treating fibers that comprises beating them in water, removing them from the water, displacing the water in the fibers with a mixture of alcohol and toluol, and depositing a coating of rubber on the fibers.

8. A method of treating fibers that comprises beating them in water, removing them from the water, displacing the water in the fibers with a mixture of alcohol and toluol mixing the fibers in an alcohol toluol rubber solution, and precipitating a coating of rubber upon the fibers.

9. The method of treating fibers which comprises, beating them in water, removing them from the water, displacing the water in the fibers with a liquid miscible with water and toluol, and displacing the liquid with toluol.

10. The method of treating fibers which comprises, beating them in water, removing them from the water, displacing the water in the fibers with a liquid miscible with water and toluol, and displacing the liquid with a mixture of toluol and alcohol.

In witness whereof, I have hereunto signed my name in the presence of two subscribing witnesses.

BURT H. YACKEE.

Witnesses:
JOHN T. CHARLESON,
F. A. LIND.